US005191530A

United States Patent [19]
Hussmann et al.

[11] Patent Number: 5,191,530
[45] Date of Patent: Mar. 2, 1993

[54] METHOD AND APPARATUS TO REGULATE ILLUMINATION RANGE OF A MOTOR VEHICLE

[75] Inventors: Micha Hussmann, Lippstadt; Joachim Hufnagel, Menden, both of Fed. Rep. of Germany

[73] Assignee: Hella KG Hueck & Co., Lippstadt, Fed. Rep. of Germany

[21] Appl. No.: 737,725

[22] Filed: Jul. 30, 1991

[30] Foreign Application Priority Data

Aug. 6, 1990 [DE] Fed. Rep. of Germany ....... 4024913

[51] Int. Cl.$^5$ ............................................. B60Q 1/08
[52] U.S. Cl. ................................ 364/424.05; 362/71; 307/10.8
[58] Field of Search .................. 364/424.05; 307/10.8; 315/77, 82; 362/71, 285, 286, 277, 428

[56] References Cited

U.S. PATENT DOCUMENTS

| | | | |
|---|---|---|---|
| 4,583,152 | 4/1986 | Kawai et al. | 362/71 |
| 4,620,267 | 10/1986 | Cibie | 362/71 |
| 4,858,080 | 8/1989 | Oikawa | 362/71 |
| 4,891,559 | 1/1990 | Matsumoto et al. | 362/71 |
| 4,908,560 | 3/1990 | Shibata et al. | 307/10.8 |

FOREIGN PATENT DOCUMENTS

3110094A1 9/1982 Fed. Rep. of Germany .

*Primary Examiner*—Gary Chin
*Attorney, Agent, or Firm*—Griffin Butler Whisenhunt & Kurtossy

[57] ABSTRACT

In a method and apparatus to regulate the illumination range of a motor vehicle in which, at a position on a front axle and at a position on a rear axle, signals are measured which are dependent upon the relative position of a motor-vehicle body to the front axle and the rear axle, with a difference formation between the signal from the front axle and that of the rear axle being accomplished with a resulting difference signal, as a nominal-value signal, being filtered to a first average-value formation. The time for the first average-value formation is determined by a first filter (F1) time constant with positions of adjusting elements being regulated when the first filtered nominal-value deviates from a predetermined, or set, value. In order to be able to recognize inclination changes of the motor-vehicle body which cannot be attributed to changes in load or road surface unevenness, simultaneously with the first average-value formation, a second average-value formation of the nominal-value signal, with a second short filter (F2) time constant, and a third average-value formation of the nominal-value signal, with a third long filter (F3), time constant takes place. The thusly produced second filtered nominal-value signal is compared with the thusly produced third filtered nominal-value signal and upon the existence of a difference between the second filtered nominal-value signal and the third filtered nominal-value signal the first average-value formation is interrupted and upon termination of the difference is again turned on.

8 Claims, 1 Drawing Sheet

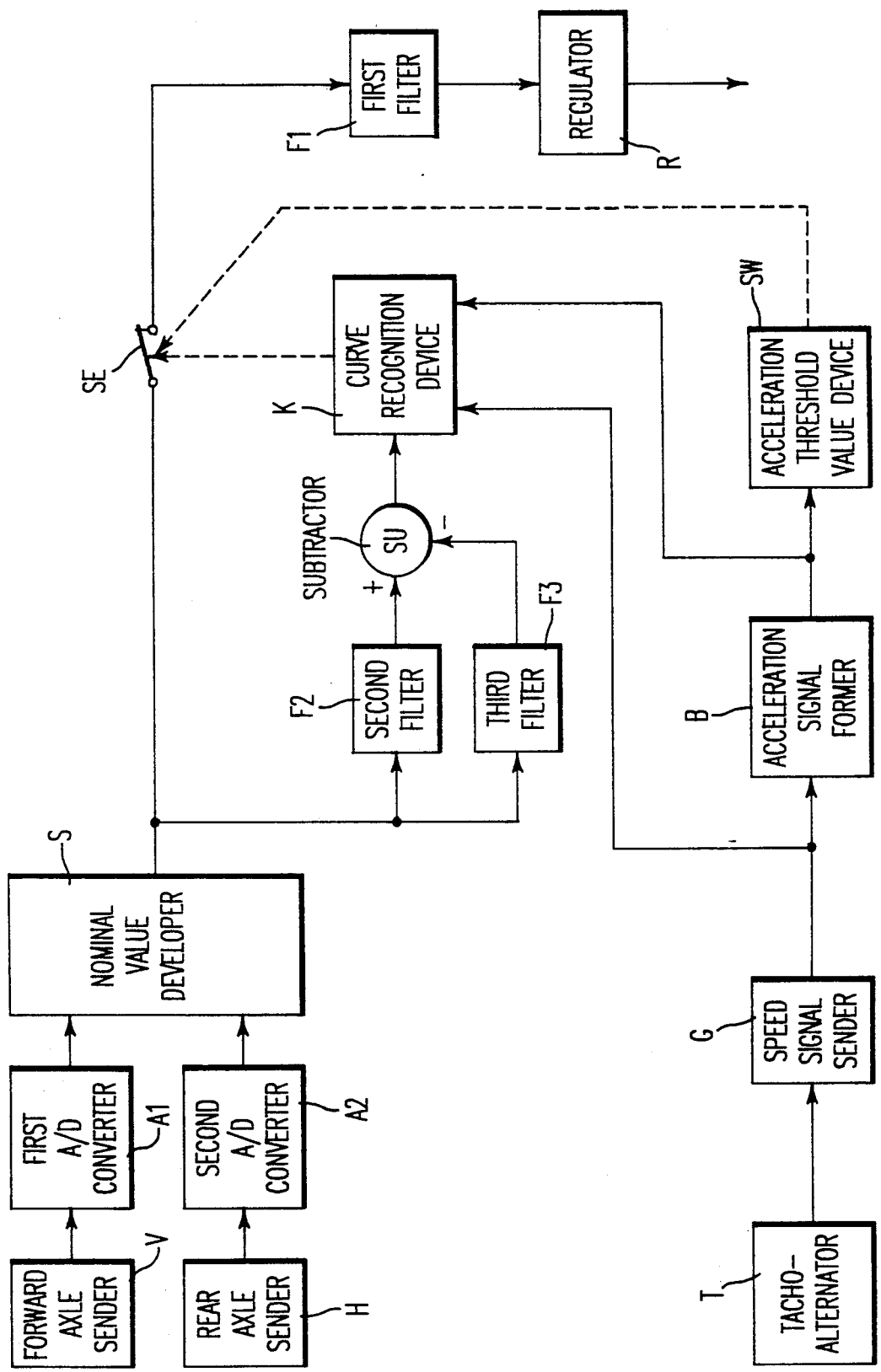

METHOD AND APPARATUS TO REGULATE ILLUMINATION RANGE OF A MOTOR VEHICLE

BACKGROUND OF THE INVENTION

This invention concerns a method to regulate illumination range of a motor vehicle in which signals are measured, or developed, at a position on a front axle and at a position on a rear axle which signals depend upon a relative position of a motor-vehicle body, or chassis, to the front axle and the rear axle, with a difference between these signals being formed as a difference signal, with the resulting difference signal, as a nominal-value signal, being filtered to a first mean, or average, value, with a time for the first average-value formation being determined by a first filter time constant and positions of adjusting elements being regulated when the first filtered, nominal-value, signal deviates from a predetermined, or set, value and an apparatus for performing this method.

A method and an apparatus to regulate the illumination range of a motor vehicle of this general type is known from German Offenlegungschrift DE OS 31 10 094 A1.

Sensors which measure the relative position of a body, or chassis, of a motor vehicle to motor-vehicle axles, or motor-vehicle wheels, are coupled to an analog-multiplexer which feeds the signals from the sensors via an analog/digital-converter to a microprocessor. A filtering of the available signals results in which, in a definite, or set, time period, a mean, or average, value formation of the signals is carried out. For this purpose a number of measured values to be included is set, or predetermined. From the average values then, for each sensor pair corresponding to a front axle sensor and a rear axle sensor, a difference signal is produced corresponding to a headlight adjustment value. Each of these difference signals is fed to a digital/analog converter which is coupled via a respective subsequent operational amplifier with a headlight adjustment apparatus. Depending upon the sense (plus or minus) of the difference signals the adjusting elements are thereby moved forwardly or backwardly and headlight position registers in the microprocessor count upwardly or downwardly. The difference signal must additionally exceed a predetermined threshold value before the headlight adjusting apparatus are operated.

It has proven to be particularly disadvantageous that inclination changes of the motor vehicle body not attributable to changes in a load or road surface unevenness are not recognized and that the regulation upon an appearance of such inclination changes are not altered, whereby false adjustments of the illumination range results so that oncoming traffic is blinded and dangerous situations are brought about. Such an inclination change can for example be conditioned, or caused, by driving about a curve, whereupon, with a filter time constant for average-value formation as is suggested here, a false headlight adjustment for approximately one minute after completion of driving about the curve results because, during the time of driving about the curve, measured values for the average-value formation are used which falsify operating conditions during straight driving.

It has proven to be disadvantageous that with the known apparatus for regulating illumination range of a motor-vehicle four sensors are required to measure a relative position of a body of a motor vehicle to motor-vehicle axles, or motor-vehicle wheels, which sensors are coupled to a microprocessor via an analog-multiplexor because in this manner a cost intensive and expensively constructed apparatus results which, additionally gives rise to high costs upon production and mounting.

It is an object of this invention to provide regulation of an illumination range of a motor vehicle which is uncomplicated and cost effective and which recognizes inclination changes of the motor vehicle body which are not the result of changes of loading or road surface unevenness and which eliminates false adjustments during regulation of the illumination range caused by these of inclination changes.

SUMMARY OF THE INVENTION

According to principles of this invention simultaneously with a first average-value formation, a second average-value formation of the nominal-value signal with a second, short, filter time constant and a third average-value formation of the nominal-value signal with a third, long, filter, time constant takes place, the thusly produced second filtered nominal-value signal being compared with the thusly produced third filtered nominal-value signal and, upon the presence of a difference between the second filtered nominal-value signal and the third filtered nominal-value signal, the first average value formation being interrupted and, upon termination, or absence, of a difference, it again being established, or turned on.

BRIEF DESCRIPTION OF THE DRAWING

The foregoing and other objects, features and advantages of the invention will be apparent from the following more particular description of a preferred embodiment of the invention, as illustrated in the accompanying drawing in which reference characters refer to the same parts throughout the drawing. The drawing not necessarily being to scale, emphasis instead being placed upon illustrating principles of the invention in a clear manner.

The drawing is a block circuit diagram of an embodiment of this invention to regulate illumination range of a motor vehicle according to principles of this invention.

DESCRIPTION OF A PREFERRED EMBODIMENT

A front-axle sensor sender (a device associated with a sensor for sending a sensed signal) V, which produces analog signals in dependence upon a position, or attitude, of a motor-vehicle body, or chassis, to a front axle is electrically, conductively, coupled over a first analog/digital converter A1 with a nominal-value developer, or former, S. A rear axle sender (a device associated with a sensor for sending a sensed signal) H which forms analog signals in dependence upon a position, or attitude, of the motor vehicle body, or chassis, to the rear axle is electrically, conductively, coupled via a second analog/digital converter A2 with the nominal-value developer S. The nominal-value developer S forms a difference between the signals from the front axle sender V and the rear axle sender H and multiplies, depending upon requirements, the thusly developed nominal-value signals by a necessary amplification factor.

The nominal-value developer S is electrically, conductively, connected via a switching device SE with a first filter F1 which, in dependence upon a fixed or variable first filter time constant, carries out an average-value formation of the nominal-value signals from the nominal-value developer. The filter time constant can have a fixed value of, for example, around 30 seconds. Depending upon given requirements, the filter time constant can however also be shorter or longer. In another embodiment, the filter time constant can be made to be changeable in dependence upon driving parameters of the motor vehicle.

The first filter F1 is electrically coupled with a regulator R which regulates the positions of adjusting elements (not shown here) for adjustment of a light range of headlights for the motor vehicle.

The nominal-value developer S is additionally electrically connected in parallel with a second filter F2 and with a third filter F3 whose outputs are electrically coupled with a subtractor SU. The second filter F2 has a second, short, filter, time constant whereby a second filtered nominal-value signal is developed which is greatly dependent upon short duration inclination changes of the motor vehicle body. The third filter F3 has a third, long, filter, time constant so that a third filter nominal-value signal is formed that is independent, or substantially independent, of short time period changes in the inclination of the motor vehicle body. The second filtered nominal-value signal is here, for example, fed to the subtractor SU as a positive value while the third filter nominal-value signal is here, for example, fed to the subtractor SU with a negative value. The subtractor SU develops a difference between the signals from the second filter F2 and the third filter F3, which are dependent upon the mounting positions of the axle senders, or sensors, V and H, and feeds this to a curve recognition device K which upon the presence of a difference between the second filtered nominal-value signal and third filtered-nominal value signal opens the switching device SE and upon termination of such difference closes the switching device SE. The switching device SE can be constructed as a semiconductor switch. In another embodiment the switching device SE can be part of the first filter F1.

The filter-time constant of the second filter F2 can for example amount to approximately one second so that short-time-period inclination changes in the motor-vehicle body are recognized sufficiently quickly. The filter-time constant of the third filter F3 can lie in a range of a few minutes so that short-time-period inclination changes in the motor vehicle body do not influence or only slightly influence the third filter-value signal. The filter time constants can thereby, depending upon application and upon requirements, be longer or shorter.

So that at low speeds all changes in inclination of the motor vehicle body can be respected for regulation of the illumination range, the curve recognition device K is electrically coupled with a speed signal sender G and has a speed threshold-value device with which a minimum speed is set under which the switching device SE is not opened by the curve recognition device K. In order for the speed signal sender G to form a speed signal it is coupled to a tacho-alternator T. The minimum speed can for example be about 30 km/h. Dependent upon requirements, the minimum speed can also be greater or less.

The speed signal sender G is additionally coupled with an acceleration signal former B which, in turn, is electrically coupled with the curve recognition device K for only opening the switching device SE upon the presence of a difference from the subtractor SU if no acceleration of the motor vehicle is present.

So that upon short duration positive or negative acceleration of the motor vehicle, which for example appears upon braking or upon giving a great amount of gas, no false adjustment of the illumination range takes place which can lead to dangerous situations, the acceleration signal former B is electrically coupled with an acceleration threshold value device SW which, upon a positive and/or negative acceleration of the motor vehicle exceeding a minimum boundary value, opens the switching device SE and upon completion of exceeding this boundry value again closes the switching device SE.

In the following, with the help of the apparatus depicted in the only figure, the method of regulating the illumination range of a motor vehicle will be briefly described.

Each inclination change of the motor vehicle body is measured through the front axle sender V and the rear axle sender H and the measured signals are fed over the first and second analog/digital converters A1, A2 to the nominal-value developer S. The nominal-value developer S forms, or develops, the difference between the input signals and multiples this, if necessary, by an amplification factor. The thusly formed nominal-value signal is simultaneously fed to the first filter F1, the second filter F2, and the third filter F3. Each of these filters, F1, F2, F3 carries out a mean-value, averaged value or average-value, formation of the nominal-value signal according to its respective operative filter time constant.

The first filter-time constant of the first filter F1 is thereby so chosen that a best possible regulation of the illumination range results. For a particularly cost effective and uncomplicated regulation of the illumination range with the adjusting elements (not shown here), which are constructed to be quite uncomplicated and durable, the first filter time constant can for example be about 30 seconds however, depending upon given requirements it can also be smaller or greater.

In order to recognize an inclination change in the motor-vehicle body that is not attributable to a change in the load, or loading, of the vehicle, or to road surface unevenness, the second filter F2 has a second, short, filter time constant which, for example, is approximately in a range of around one second, whereby the formed second-filter nominal-value signal reproduces short-time changes in the inclination of the motor-vehicle body, and the third filter F3 has a third, long, filter time constant whereby the third filtered nominal-value signal is independent, or substantially independent, of the short-time changes in the inclination of the motor-vehicle body. If a difference between the second filtered nominal-value signal and the third filtered nominal-value signal exists, which is developed by the subtractor SU, the curve recognition device K interrupts the first average value formation by the first filter F1 so that the previously regulated, or set, headlight adjustment is frozen and false adjustments caused by, for example, driving about a curve can be prevented. After termination of a difference between the second filtered nominal-value signal and the third filtered nominal-value signal the first average value formation is again reinstated, or turned on.

The interruption of the first average value formation through the first filter F1 is thereby tied to two conditions:
1. Because at low speeds each change in the inclination of a motor vehicle body is to be respected upon regulation of the illumination range, the first average value formation is only interrupted after a minimum speed for the motor vehicle has been exceeded.
2. The first average-value formation will only be interrupted when no acceleration of the motor vehicle is taking place.

So that upon short-duration great positive or negative accelerations of the motor vehicle, which for example appear upon strong braking or upon a short-duration flooring of an accelerator, no false adjustments upon regulation of the illumination range appear which could cause blinding of oncoming traffic or could lead to a loss of vision range, upon an exceeding of at least a minimum border value for a positive and/or negative acceleration of the motor vehicle, the first average value formation is interrupted, and, at the end of this excess, is again reinstated.

In another embodiment the second filter F2 can be directly fed a digitalized signal from the front axle sensor V and the third filter F3 can be directly fed the digitalized signal from the rear axle sender H, whereby also in an uncomplicated and cost effective manner a recognition of inclination changes of the motor vehicle body is made possible which is not attributable to a change in loading, a change in acceleration, or in road surface unevenness.

It is beneficial that simultaneous with the first average value formation a second average value formation of the nominal-value signal with a second, short, filter time constant and a third average value formation of the nominal-value signal with a third, long, filter time constant is carried out because in this manner, in an uncomplicated and cost effective manner, for one thing, a first filtered nominal-value signal is produced that controls the regulator in a manner that the illumination range of the motor vehicle is adjusted in dependence upon the appearance of inclination changes in the best possible manner and, for another thing, a second filtered nominal-value signal is produced that, because of the second, short, filter time constant makes available short time duration changes in the inclination of the motor vehicle body for a further analysis and additionally a third filtered nominal-value signal is produced that because of the third, long, filter time constant makes available a signal for further analysis on which short time inclination changes of the motor vehicle body have no, or very little, influence.

In that the thusly created second filtered nominal-value signal is compared with the thusly created third filtered nominal-value signal the benefit results that changes in the inclination of the motor vehicle body which are not attributable to changes in loading or in street surface unevenness can be measured and recognized in a particularly uncomplicated and cost effective manner.

In this connection, it has proven to be particularly beneficial that the first average value formation is interrupted by the presence of a difference between the second filtered nominal-value signal and the third filtered nominal-value signal and that after the elimination of the difference it is turned back on, because, in this manner, upon such an inclination change which, for example, can be caused by driving about a curve, the regulator can be fed a first filtered nominal-value signal that is independent of the measured inclination change while driving about the curve so that driving about a curve, or another short-duration inclination change of the motor vehicle's body during a drive, has no influence on the first filtered nominal-value signal and the regulation, or adjustment, by the first filtered nominal-value signal formed before the short time inclination continues to be effective, whereby false adjustments upon regulation of the illumination range, and thereby a blinding of the oncoming traffic which can lead to dangerous situations, can be avoided since the resulting regulation is based on the previously formed first filtered nominal-value and thereby adjustment of the headlight during the period of interruption is not changed.

It is beneficial that the second filter time constant is shorter than the first filter time constant and that the third filter time constant is longer than the first filter time constant because in this manner, for one thing, a regulation of the illumination range of the motor vehicle is made possible which encompasses all of the changes in the inclination of the motor vehicle body in the best possible manner and, for another thing, it is ensured that inclination changes of the motor vehicle body which are not caused by changes in loading or road surface unevenness can be dependably recognized and that upon such inclination changes the first mean, or average, value formation is interrupted so that false adjustments can be dependably avoided.

Because the first average value formation, upon presence of a difference between the second filtered nominal-value signal and the third filtered nominal-value signal, is only interrupted when the motor vehicle exceeds a minimum speed and/or no positive or negative acceleration of the motor vehicle is present, the advantage results that, for one thing, upon low speeds of the motor vehicle, according to the first average value formation, all inclination changes of the motor vehicle body upon regulation of the illumination range are respected and, for another thing, only upon exceeding the minimum speed will the first average value formation be interrupted and the first filtered nominal-value will be therewith frozen at the previously formed nominal-value whereby the position of the headlight will not be changed when no positive or negative acceleration of the motor vehicle is present so that false adjustments of the illumination range can be avoided in an uncomplicated and cost effective manner, but acceleration-caused-illumination-range changes during regulation can be respected.

In this connection, it is particularly beneficial that upon a positive and/or negative acceleration of the motor vehicle exceeding a minimum border value the first average value formation is interrupted and after this excess has ended is again reinstated, or turned on, because in this manner, for example, upon a short-duration, hard, braking or upon a short-duration great acceleration the setting of the headlight at a previously-formed value, corresponding to the previously formed first filtered nominal-value signal, is frozen whereby false adjustments of the headlight and thereby the causing of dangerous situations can be avoided.

The object of this invention is inventively solved in that the coupling between the nominal value former and the first filter, which has a first filter time constant and which is coupled to the regulator, has a switching device arranged therein; in that the nominal-value former is coupled with a second filter having a second short filter time constant; in that the nominal-value former is coupled with a third filter having a third long filter time constant; in that the second filter and the third filter are coupled with a subtractor; in that the subtractor is coupled with a curve recognition device; and in that the curve recognition device opens the switching device upon the presence of a difference between the signals from the second filter and the third filter and upon termination of the difference again closes the switching device.

It is beneficial that the coupling between the nominal-value former, or developer, and the first filter, which has a first filter time constant and which is coupled to the regulator, has a switching device arranged therein because in this manner upon an opening of the switching device the average value formation of the first filter is interrupted and the first filtered nominal-value signal from the first filter during the time in which the switching device is open is frozen at a fixed, previously-formed, value and thereby also the adjustment of the headlight during this time is not changed.

Because the nominal-value developer, or former, is coupled with a second filter which has a second short filter time constant the benefit results that a second filtered nominal-value signal is formed that is strongly dependent upon short time changes in the inclination of the motor vehicle body.

Because the nominal-value developer is coupled with a third filter which has a third long filter time constant the benefit results that a third filtered nominal-value signal is formed that is independent, or almost independent, of changes in the inclination of the vehicle body appearing only for a short time.

In this connection, it is beneficial that the second filter and the third filter are coupled with a subtractor because in this manner, in a particularly uncomplicated and cost effective manner, a difference between the developed second and third filtered, nominal-value, signals can be formed with which the inclination changes of the motor vehicle body not attributable to changes in load or in road surface unevenness can be easily, and without a great expense, recognized.

It is beneficial that the subtractor is coupled with a curve recognition device and that the curve recognition device, upon the presence of a difference between the signals from the second filter and the third filter opens the switching device and that upon termination of the difference again closes the switching device because in this manner, in an uncomplicated and cost effective manner, because of the formed difference, driving about a curve can be recognized and, upon driving about a curve, by opening the switching device the average value formation by the first filter is interrupted so that the previously set headlight adjustment is frozen whereby the nominal-values which are caused by short time inclination changes in the motor vehicle body are not respected for regulation of the illumination range which prevents false adjustments and the creation of dangerous situations.

That the second filter time constant is shorter than the first filter time constant and that the third filter time constant is longer than the first filter time constant results, for one thing, in the advantage that the illumination range based on the first filter time constant is controlled as best as possible in dependence on inclination changes of the motor vehicle body and, for another thing, in a particularly uncomplicated and cost effective manner, inclination changes are dependably recognized which are not caused by loading or by road surface unevenness, whereby upon opening of the switching device, in case of such inclination changes, false adjustments of the illumination range are particularly dependably prevented.

It is beneficial that the curve recognition device is coupled, for one thing, to a speed signal sender and, for another thing, to an accelerations signal sender and that the curve recognition device has a speed threshold value device because in this manner for, one thing, it is assured that upon small velocities of the motor vehicle all inclination changes followed by the first filter time constant of the first filter for regulation of the illumination range, are respected and, for another thing, an interruption of the average value formation by the first filter through the curve recognition device can only be brought about when no acceleration of the motor vehicle is present so that false adjustments during regulation of the illumination range will be avoided.

Because the acceleration signal sender is coupled with an acceleration threshold value device which, upon the exceeding of a minimum border value for a positive or negative acceleration of the motor vehicle, opens the switching device and, upon termination of the excess, again closes it, the benefit results that, upon short-duration high braking or short-duration great acceleration of the motor vehicle, the first filtered nominal-value formed by the first filter is not falsified, but rather its regulation is frozen at the previously formed first filtered nominal-value whereby false adjustments caused by short-duration great accelerations or hesitations, upon regulation of the illumination range, are certainly and dependably prevented in an uncomplicated cost effective manner.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed or defined as follows:

1. In a method of regulating an illumination range of a motor vehicle of a type comprising the steps of developing front-axle and rear-axle signals which respectively depend upon a relative position of a motor-vehicle body to a front axle and a rear axle of the motor vehicle, forming a resulting difference signal indicative of a difference between the front-axle signal and the rear axle signal, filtering and resulting difference signal, as a nominal-value signal, to form a first average value as a function of time, wherein said time for development of the first, average, nominal, value is determined by a first filter time constant, and regulating positions of lamp adjusting elements when the first, filtered average nominal-value deviates from a predetermined value, wherein the improvement: simultaneously with said formation of the first average value, filtering the resulting difference signal to form a second average value of the nominal-value signal with a filter having a second filter time constant and filtering the resulting difference signal to form a third average value of the nominal-value signal with a third filter time constant; comparing and thusly produced second nominal average-value signal with the thusly produced third average-value signal, and, upon the presence of a difference between the second average-value signal and the third average-value signal, interrupting use of the first average value formation for regulating positions of said lamp adjusting elements and, upon a termination of said difference, reinstating use thereof for regulating positions of said lamp adjusting elements.

2. Method as in claim 1 wherein the second filter time constant is shorter in time than said first filter time constant and the third filter time constant is longer than the first filter time constant.

3. Method as in claim 2 wherein the first average value formation upon the presence of the difference between the second average-value signal and the third average-value signal is interrupted when the motor vehicle has exceeded a minimum speed and no substantial positive or negative acceleration of the motor vehicle is present.

4. Method as in claim 3 wherein upon the motor vehicle exceeding a minimum border value for said positive or said negative acceleration of the motor vehicle the first average-value formation is interrupted and when the acceleration no longer exceeds the minimum border value the interruption is terminated.

5. Apparatus for regulating the illumination range of a motor vehicle with a front axle sender and a rear axle sender which produces signals in dependence upon the position of a motor vehicle body to the front axle and the rear axle, said apparatus having a nominal-value developer which develops a difference signal indicative of a difference between signals from the front axle sender and the rear axle sender, having at least one first filter which receives said difference signal and which carries out an averaging thereof to create a filtered nominal-value as a function of time, and having a regulator which receives the filtered nominal value and, in dependence upon the filtered nominal value, regulates positions of adjusting elements for adjusting an illumination range of the motor vehicle, said apparatus further including the improvement: that a switching device is connected between said nominal-value developer and the first filter, having a first filter time constant; that the nominal-value developer is coupled to a second filter having a second filter time constant and to a third filter having a third filter time constant; that the second filter and the third filter are coupled to a subtractor; that the subtractor is coupled with a curve recognition device; and that the curve recognition device opens the switching device upon the presence of a difference between the signals from the second filter and the third filter and upon termination of the difference again closes the switching device.

6. Apparatus as in claim 5 wherein the second filter time constant is shorter than the first filter time constant and the third filter time constant is longer than the first filter time constant.

7. Apparatus according to claim 6 wherein the curve recognition device, is coupled with a speed signal sender and wherein the curve recognition device has a speed threshold value device for recognizing when a speed indicated by said speed signal sender passes a predetermined speed threshold and modifies operation of the switching device in response thereto.

8. Apparatus according to claim 7 and further comprising an acceleration signal former which is coupled with an acceleration threshold value device for opening the switching device only when an acceleration indicated by said acceleration signal former further exceeds a threshold value of said threshold value device.

* * * * *